US012693665B2

(12) United States Patent (10) Patent No.: US 12,693,665 B2

Jahani et al. (45) Date of Patent: Jul. 28, 2026

---

(54) SYSTEM AND METHOD OF SEMANTIC SEGMENTATION FOR A CLEANING DEVICE

(71) Applicant: Avidbots Corp, Kitchener (CA)

(72) Inventors: Ali Jahani, Toronto (CA); Adel Fakih, Waterloo (CA); Egor Bredikhin, Kitchener (CA); Yoohee Choi, Waterloo (CA); Umer Rasheed, Waterloo (CA); Abhishank Gaba, Waterloo (CA)

(73) Assignee: Avidbots Corp, Kitchener (CA)

( * ) Notice: Subject to any disclaimer, the term of this patent is extended or adjusted under 35 U.S.C. 154(b) by 156 days.

(21) Appl. No.: 18/481,367

(22) Filed: Oct. 5, 2023

(65) Prior Publication Data

US 2024/0118696 A1 Apr. 11, 2024

Related U.S. Application Data

(60) Provisional application No. 63/413,587, filed on Oct. 5, 2022.

(51) Int. Cl.
*G05D 1/02* (2020.01)
*G05D 1/00* (2006.01)

(52) U.S. Cl.
CPC ......... *G05D 1/0214* (2013.01); *G05D 1/0221* (2013.01); *G05D 1/0246* (2013.01)

(58) Field of Classification Search
CPC ............. G06T 7/11; G06T 2207/10028; G06T 2207/20081; G06T 2207/20112; G05D 1/0214; G05D 1/0221; G05D 1/0246; G05D 1/242; G05D 2101/20; G05D 2105/10; G05D 2107/70; G05D 2109/10;
(Continued)

(56) References Cited

U.S. PATENT DOCUMENTS

| | | | |
|---|---|---|---|
| 2018/0114064 A1* | 4/2018 | Schnittman | ................ B25J 5/00 |
| 2019/0208979 A1* | 7/2019 | Bassa | .................... G05D 1/0274 |
| 2020/0051252 A1* | 2/2020 | Brown | ................ G05D 1/0088 |

(Continued)

FOREIGN PATENT DOCUMENTS

| | | | | |
|---|---|---|---|---|
| CN | 110246142 A | * | 9/2019 | ............... G06N 3/08 |
| CN | 112927278 A | | 6/2021 | |

(Continued)

OTHER PUBLICATIONS

Machine Translation: CN-113647864-A (Year: 2021).*
Machine Translation: CN-110246142-A (Year: 2019).*
Search report from GB patent office dated Mar. 13, 2024.

*Primary Examiner* — Anne Marie Antonucci
*Assistant Examiner* — Connor L Knight

(57) ABSTRACT

A system and method of semantic segmentation for an autonomous or semi-autonomous cleaning device. By using machine learning and visual data, one can teach an algorithm (e.g., a deep neural network) to distinguish between ground and non-ground spaces. The non-ground spaces are passed to the cleaning device path planning to avoid these areas. The algorithm may be programmed to detect low obstacles (e.g., cardboard boxes, low pallets, forklift tines) and other low-height obstacles. Semantic segmentation obstacle avoidance adds another layer of safety to perception safety protocols of a cleaning device.

6 Claims, 10 Drawing Sheets

(58) Field of Classification Search
CPC ........................ G05D 2111/10; G05D 2111/17;
G05D 1/243; G05D 1/622
See application file for complete search history.

(56) References Cited

U.S. PATENT DOCUMENTS

| 2022/0265110 | A1 |   | 8/2022 | Molina Cabrera et al. |
| 2023/0418297 | A1* | 12/2023 | Komoroski .......... B62D 57/032 |

FOREIGN PATENT DOCUMENTS

| CN | 113647864 | A | * | 11/2021 | ............. G01C 21/00 |
| CN | 114384920 | B |   | 4/2022 |  |
| CN | 114708435 | A |   | 7/2022 |  |

* cited by examiner

900

SYSTEM AND METHOD OF SEMANTIC SEGMENTATION FOR A CLEANING DEVICE

CROSS REFERENCE TO RELATED APPLICATIONS

The application claims priority to and the benefit of U.S. Provisional Patent Application Ser. No. 63/413,587, entitled "SYSTEM AND METHOD OF SEMANTIC SEGMENTATION FOR A CLEANING DEVICE" filed on Oct. 5, 2022, the disclosure of which is incorporated herein by reference in its entirety.

BACKGROUND

The embodiments described herein relate to autonomous and semi-autonomous cleaning devices and more particularly, to a system and method for detecting the status of one or more components and/or systems in a semi-autonomous cleaning device for improved cleaning of surfaces.

The use of autonomous and semi-autonomous devices configured to perform a set of tasks is known. For example, semi-autonomous devices or robots can be used to clean a surface, mow a lawn, collect items from a stocked inventory, etc. In some instances, however, some known robots fail to provide a user with an indication of the robot's position, progress, and/or status of one or more components of the system. For example, the problem of debris accumulation in the back squeegee of a cleaning robot or floor scrubber is a common problem.

Autonomous and semi-autonomous devices can use depth sensors to detect obstacles and height. However, detecting low-height obstacles can be challenging and unreliable using depth sensor data. This type of data is very noisy. It is extremely hard to detect low height obstacles from only depth images, while it is easy for humans to detect obstacles using visual data such as RGB cameras.

There is a desire to provide an improved system and method for detecting low-height obstacles for cleaning devices.

SUMMARY

A system and method of semantic segmentation for an autonomous or semi-autonomous cleaning device. By using machine learning and visual data, one can teach an algorithm (e.g., a deep neural network) to distinguish between ground and non-ground spaces. The non-ground spaces are passed to the cleaning device path planning to avoid these areas. The algorithm may be programmed to detect low obstacles (e.g., cardboard boxes, low pallets, forklift tines) and other low-height obstacles. Semantic segmentation obstacle avoidance adds another layer of safety to the perception safety protocols of a cleaning device.

DETAILED DESCRIPTION

Figure 1:
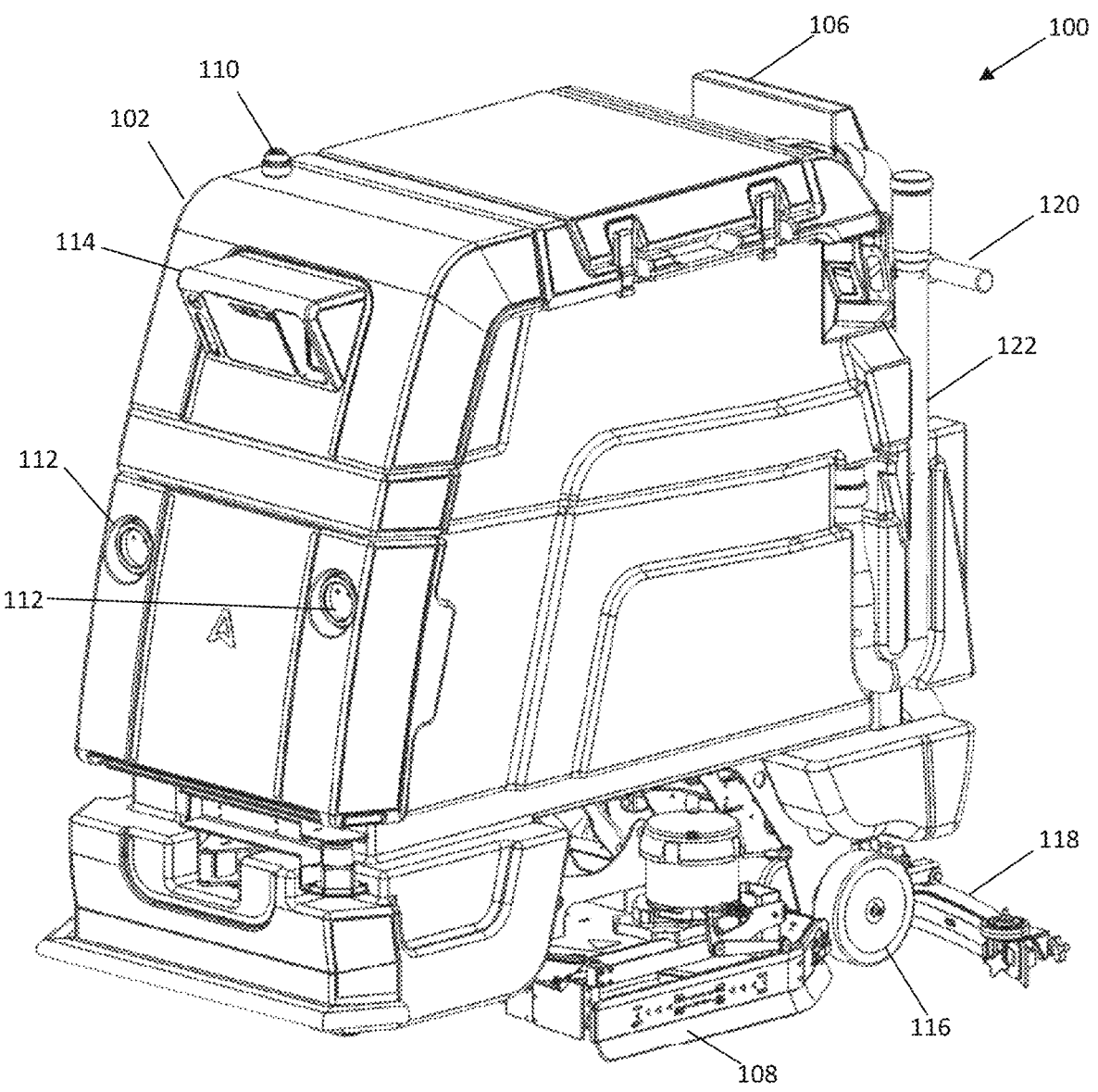
FIG. 1 is a perspective view of a semi-autonomous cleaning device.
Figure 2:
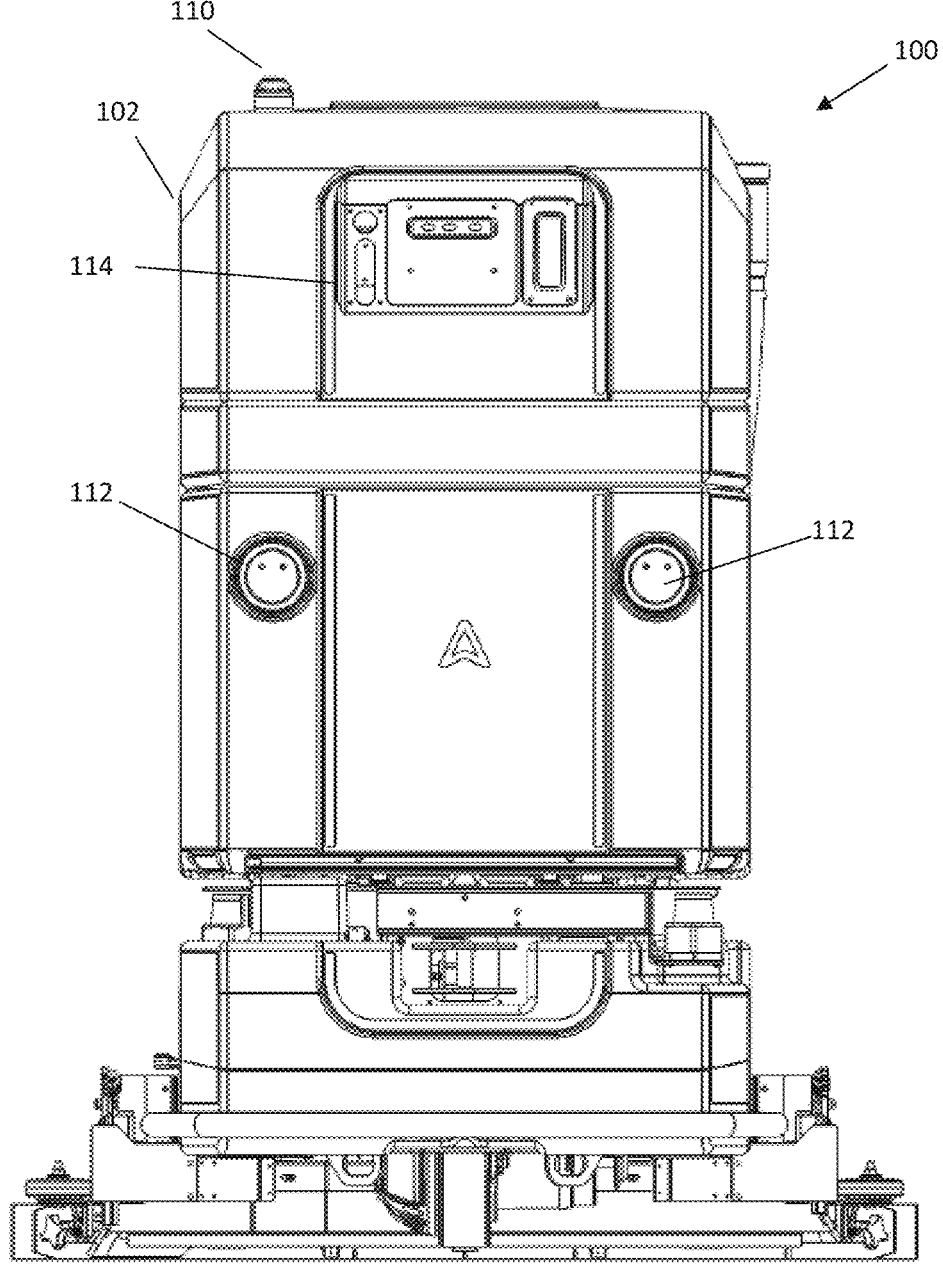
FIG. 2 is a front view of a semi-autonomous cleaning device.
Figure 3:
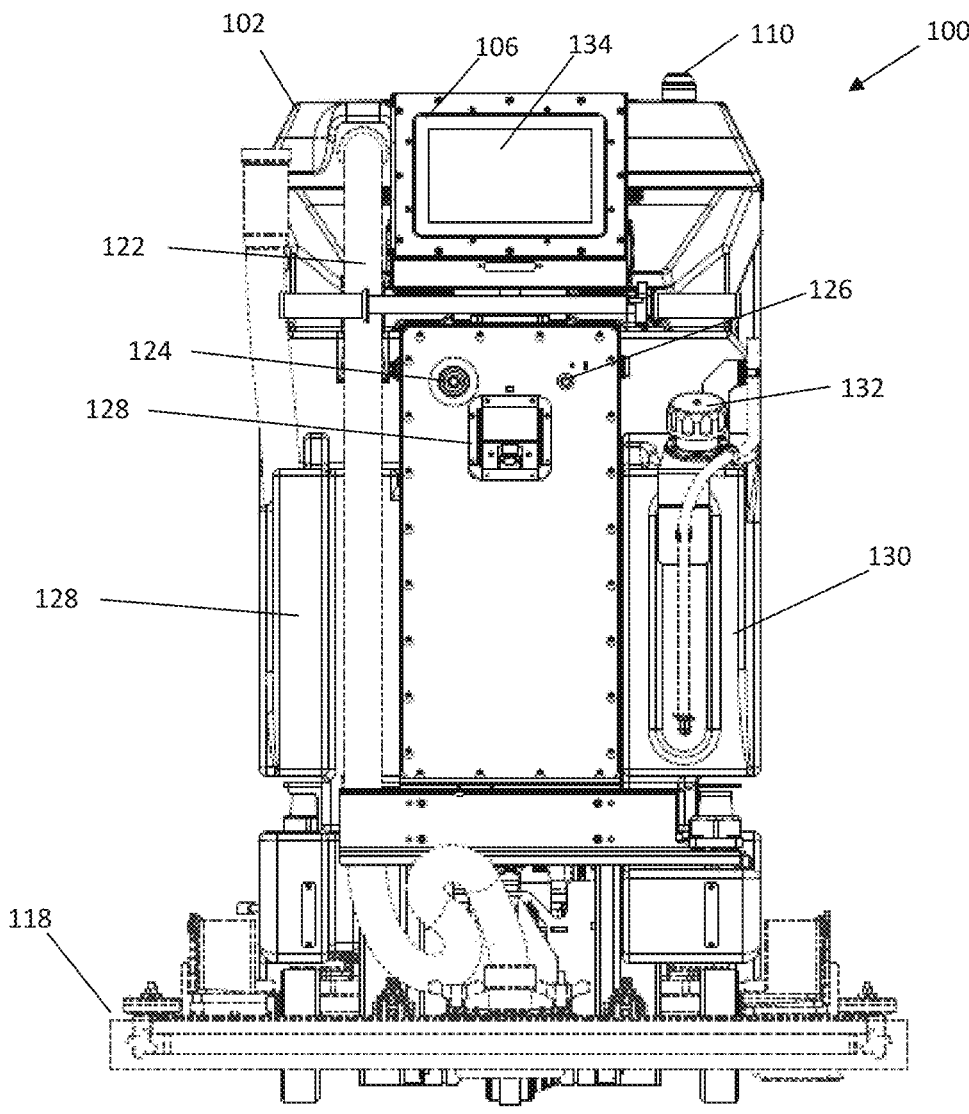
FIG. 3 is a back view of a semi-autonomous cleaning device.
Figure 4:
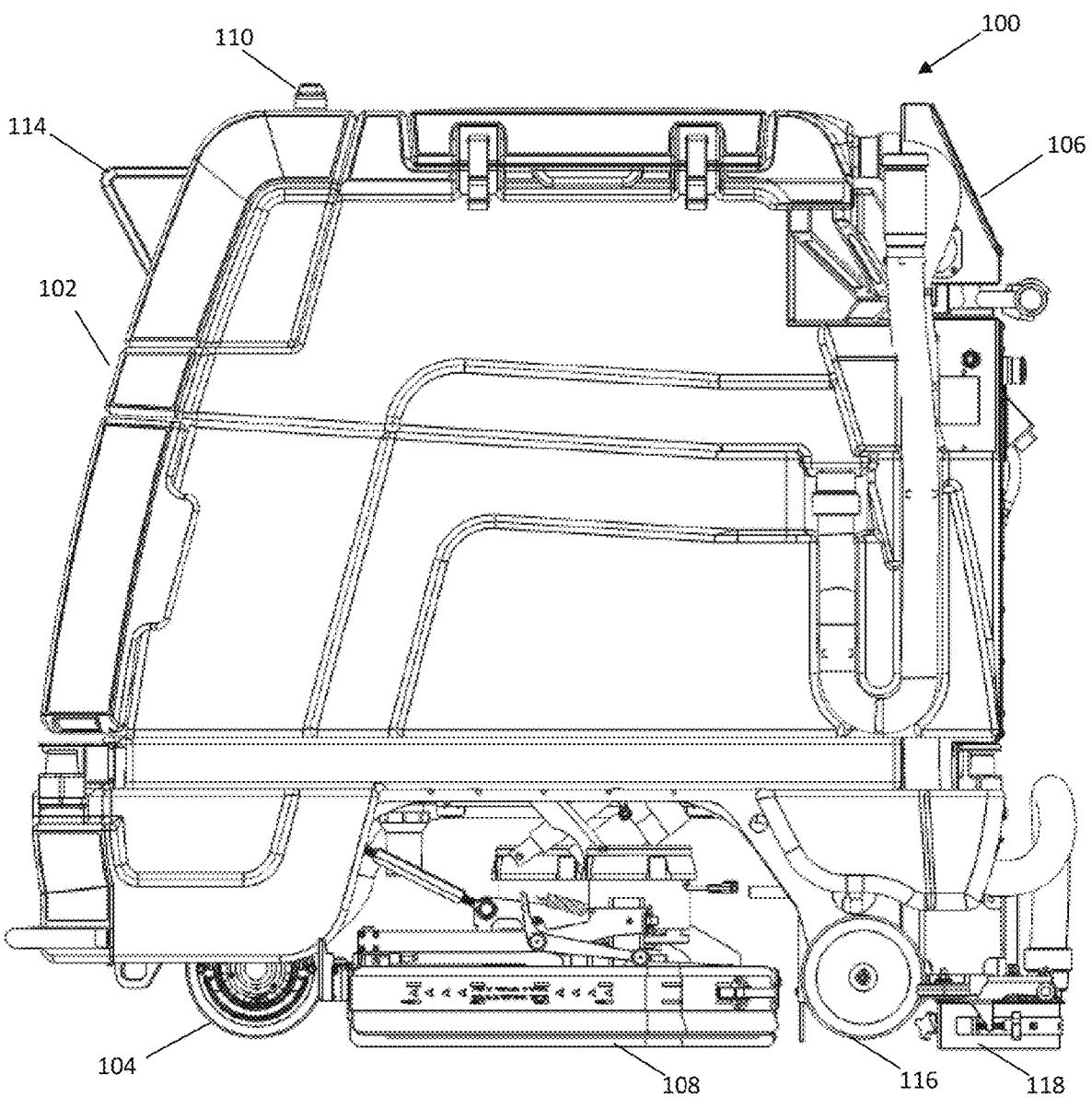
FIG. 4 is a left-side view of a semi-autonomous cleaning device.
Figure 5:
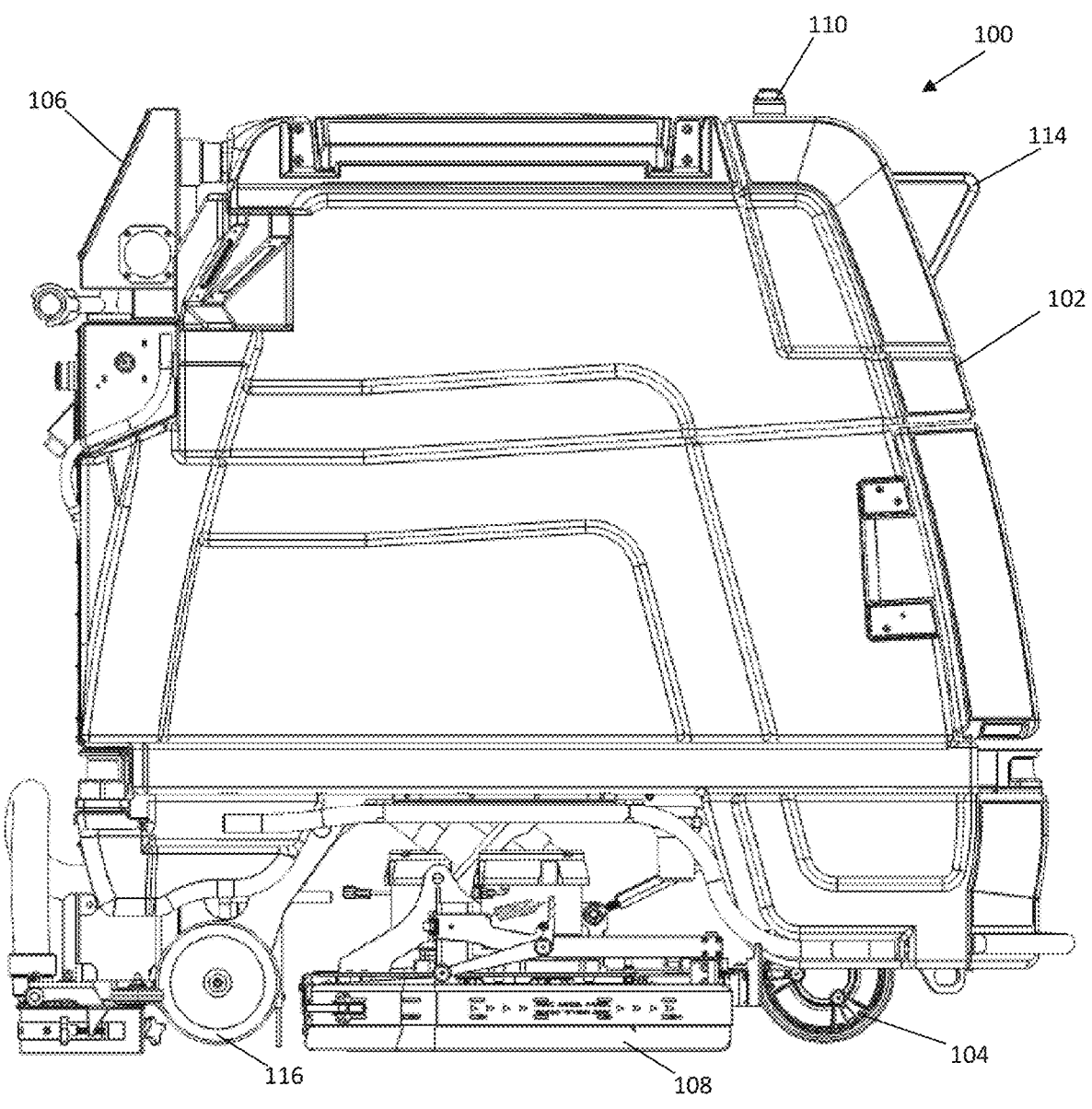
FIG. 5 is a right-side view of a semi-autonomous cleaning device.

An exemplary embodiment of an autonomous or semi-autonomous cleaning device is shown in FIGS. 1-5. FIG. 1 is a perspective view of a semi-autonomous cleaning device. FIG. 2 is a front view of a semi-autonomous cleaning device. FIG. 3 is a back view of a semi-autonomous cleaning device. FIG. 4 is a left side view of a semi-autonomous cleaning device, and FIG. 5 is a right-side view of a semi-autonomous cleaning device.

FIGS. 1 to 5 illustrate a semi-autonomous cleaning device 100. Device 100 (also referred to herein as "cleaning robot" or "robot") includes at least a frame 102, a drive system 104, an electronics system 106, and a cleaning assembly 108. The cleaning robot 100 can be used to clean (e.g., vacuum, scrub, disinfect, etc.) any suitable surface area such as, for example, a floor of a home, commercial building, warehouse, etc. The robot 100 can be any suitable shape, size, or configuration and can include one or more systems, mechanisms, assemblies, or subassemblies that can perform any suitable function associated with, for example, traveling along a surface, mapping a surface, cleaning a surface, and/or the like.

Frame 102 of cleaning device 100 can be any suitable shape, size, and/or configuration. For example, in some embodiments, frame 102 can include a set of components or the like, which are coupled to form a support structure configured to support the drive system 104, the cleaning assembly 108, and the electronic system 106. Cleaning assembly 108 may be connected directly to frame 102 or an alternate suitable support structure or sub-frame (not shown). The frame 102 of cleaning device 100 further comprises strobe light 110, front lights 112, a front sensing module 114 and a rear sensing module 128, rear wheels 116, rear skirt 118, handle 120 and cleaning hose 122. Frame 102 also includes one or more internal storage tanks or storing volumes for storing water, disinfecting solutions (i.e., bleach, soap, cleaning liquid, etc.), debris (dirt), and dirty water. More information on the cleaning device 100 is further disclosed in U.S. utility patent application Ser. No. 17/650,678, entitled "APPARATUS AND METHODS FOR SEMI-AUTONOMOUS CLEANING OF SURFACES" filed on Feb. 11, 2022, the disclosure of which is incorporated herein by reference in its entirety.

More particularly, in this embodiment, the front sensing module 114 further includes structured light sensors in a vertical and horizontal mounting position, an active stereo sensor and an RGB camera. The rear sensing module 128, as seen in FIG. 3, consists of a rear optical camera. In further embodiments, front and rear sensing modules 114 and 128 may also include other sensors including one or more optical cameras, thermal cameras, LiDAR (Light Detection and Ranging), structured light sensors, active stereo sensors (for 3D) and RGB cameras.

The back view of a semi-autonomous cleaning device 100, as seen in FIG. 3, further shows frame 102, cleaning hose 122, clean water tank 130, clean water fill port 132, rear skirt 118, strobe light 110 and electronic system 106. Electronic system 106 further comprises display 134 which can be either a static display or touchscreen display. Rear skirt 118 consists of a squeegee head or rubber blade that engages the floor surface along which the cleaning device 100 travels and channels debris towards the cleaning assembly 108.

FIG. 3 further includes emergency stop button 124 which consists of a big red button. FIG. 3 further includes a device power switch button 126 and a rear sensing module 128. Rear sensing module 128 further comprises an optical camera that is positioned to sense the rear of device 100. This complements the front sensing module 114 which provides view and direction of the front of device 100, which work together to sense obstacles and obstructions.

By using machine learning and visual data, one can teach an algorithm (e.g., a deep neural network) to distinguish between ground and non-ground spaces. The non-ground spaces are passed to the robot path planning to avoid these areas. Although this algorithm's current focus is low pallets and forklift tines, given enough data, it could learn about any small undetectable obstacles. In other words, this system and method (i.e., semantic segmentation obstacle avoidance) adds another layer of safety to our perception pipeline. According to the disclosure, a pipeline of intelligent data collection and auto annotation with humans in the loop is disclosed. With more data, the accuracy of the deep neural network to detect the low height obstacles increases over time.

Figure 6:
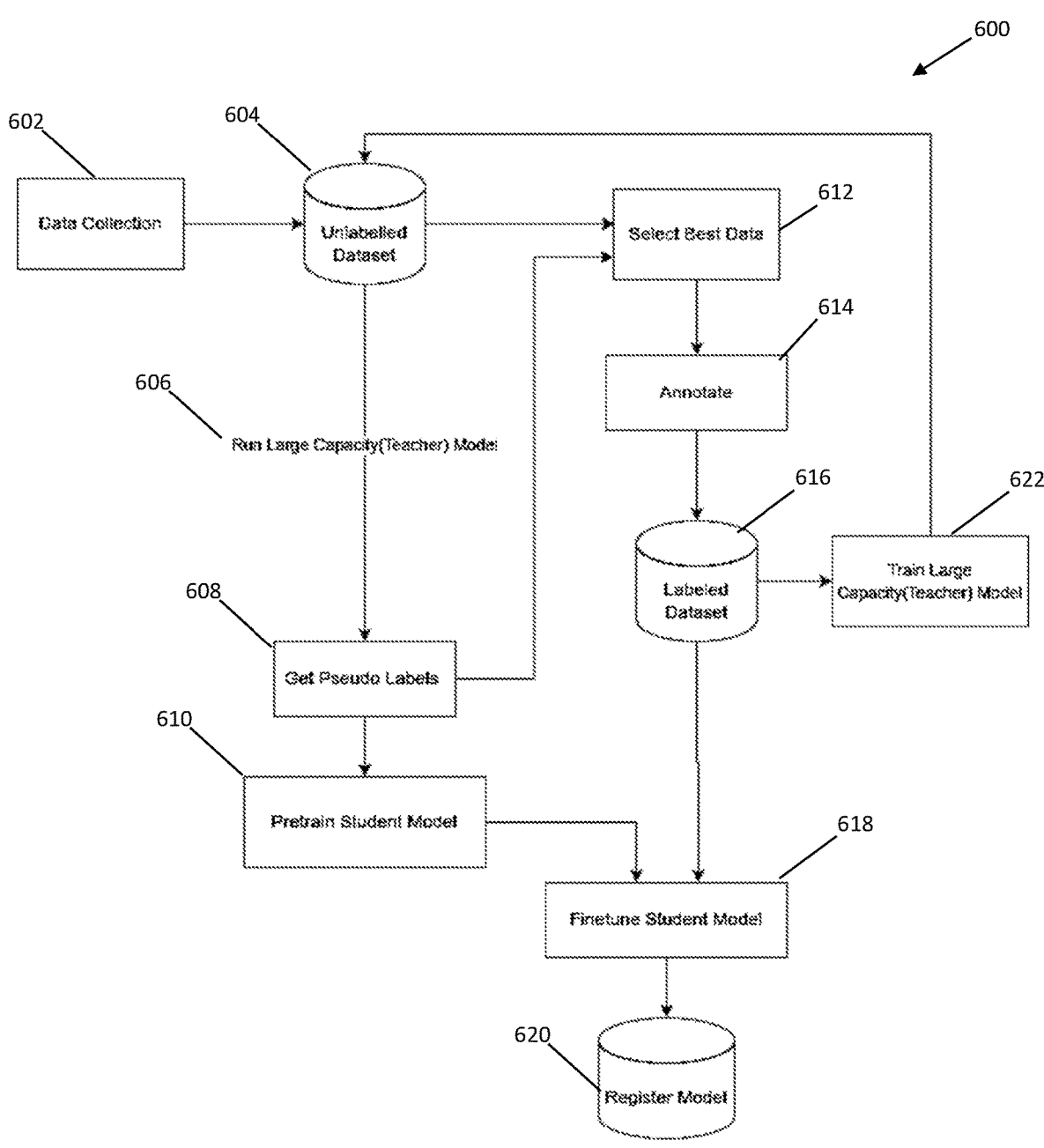
FIG. 6 is a workflow illustrating an exemplary data collection and training process.

FIG. 6 is a workflow illustrating an exemplary data collection and training process. According to FIG. 6, workflow 600 initiates with data collection 602 which is saved into an Unlabeled Dataset database (or data store) 604. Pseudo labels are created at 608 by running a large capacity teacher model 606 wherein the data is sent to a pretrain student model 610. Thereafter, the student model is fine-tuned at 618 and then finally registered 620.

According to FIG. 6, the unlabeled dataset 604 and pseudo labels 608 are selected to the best data 612 which are annotated 614 and converted into a labeled dataset 616 where the data is used to train a large capacity teacher model 622. Finally, the labeled data 616 is also used to fine tune the student model 618 and is used to register the model 620. Data Collection, Annotation, and Training Pipelines:

There are three main sections in the semantic segmentation project. The sections include:

1. Data Collection, Annotation, and Training Pipeline
2. Inference Pipeline
3. Semseg Health Monitor 1. Data collection:

There are multiple strategies for data collection including the following:

1. Rolling Buffer: This strategy saves the past couple second history of the sensor data in the RAM and if needed it could be dumped into a bag. A "rolling buffer" strategy is used for the times where the bumper detects collision, with the previous 10 seconds before the collision collected. This data is used for further training and evaluation of the final network.
2. Discrepancy: This strategy is used often. It collects snapshots whenever the semantic segmentation pipeline sees some obstacle, and there is no obstacle within the tolerance range seen by the traditional main obstacle detection pipeline.

3. Displacement: This strategy collects snapshots whenever the robot moves for at least some amount of minimum translation distance (in meters) or rotates for a minimum rotation (in radians). This strategy requires a technician presence on-site to transfer the data and is not used often due to the enormous amount of data it collects and limitations on data transfer.
4. Human in the loop collection: In the event of any interesting scenario that a remote monitor is facing, (e.g., false positive, true positive, or false negative). There is a button on the remote monitor website to trigger data collection manually.

Once the data collection is triggered intelligently using discrepancy and rolling buffer strategies, the data gets compressed and uploaded to cloud storage. Then using different data selection strategies (i.e., manual selection or active learning-based selection) the best data is selected for annotation with the help of a big capacity model and the student robot model. Once the data is annotated, the big capacity model is retrained using the additional annotated data, and another round of image selection is performed. This loop continues until the result of image selection is satisfied or the annotation budget is consumed.

According to the disclosure, once a precise large capacity model is created, the result of this model on unlabeled data is used as a pseudo ground truth. The next step is to pretrain our student model. The student model is the model that is running on the robot. It is a small model with high throughput to achieve real-time capabilities. The student model is pretrained on all the datasets, including the annotated and pseudo labels. Once the student model is pretrained, another round of fine-tuning is done to get the final model. This model is registered on the cloud to be downloaded by the robot later.

Figure 7:
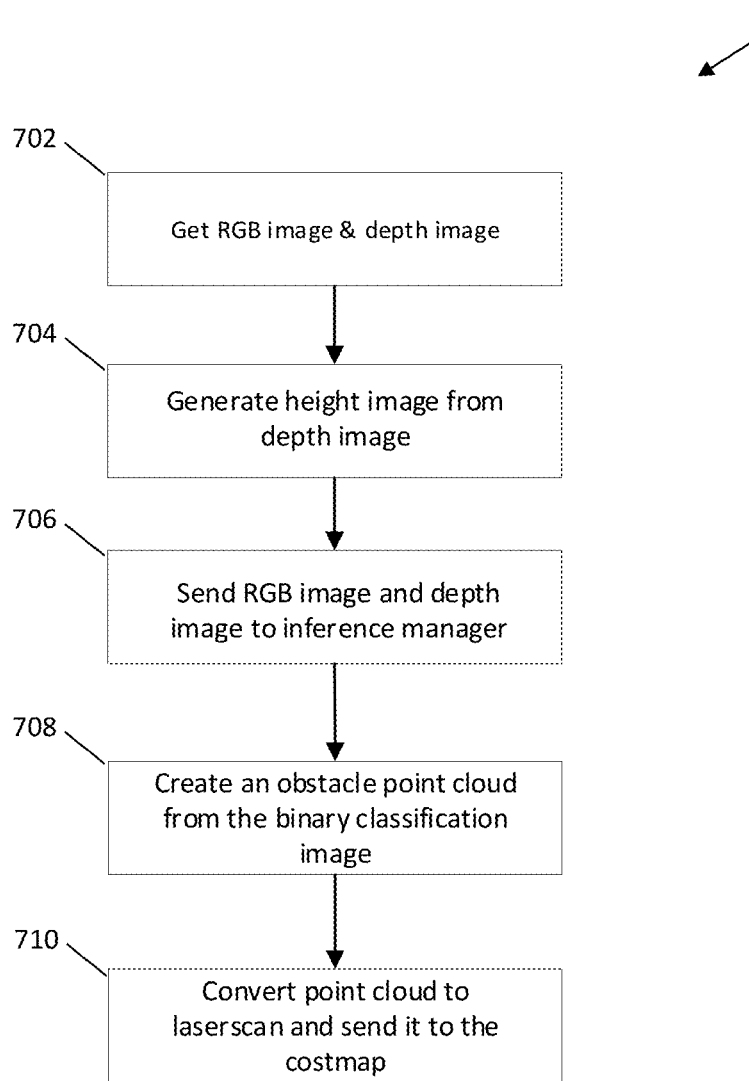
FIG. 7 is a diagram illustrating an exemplary inference pipeline algorithm.

2. Inference Pipeline:

FIG. 7 is a diagram illustrating an exemplary inference pipeline algorithm. According to FIG. 7, the inference pipeline algorithm 700 consists of the following steps:

1. Get RGB image and depth image from the driver at step 702;
2. Generate height image from depth image at step 704;
3. Send RGB image and depth image to inference manager at step 706, which runs inference on a machine learning (ML) computation device (connected to the robot) using neural network and get binary classification image (floor/non-floor);
4. Create an obstacle point cloud from the binary classification image at step 708;
5. Convert point cloud to laserscan and send it to the cost map at step 710. The cost map is used in the planning to generate a path to avoid obstacles.

Figure 8:
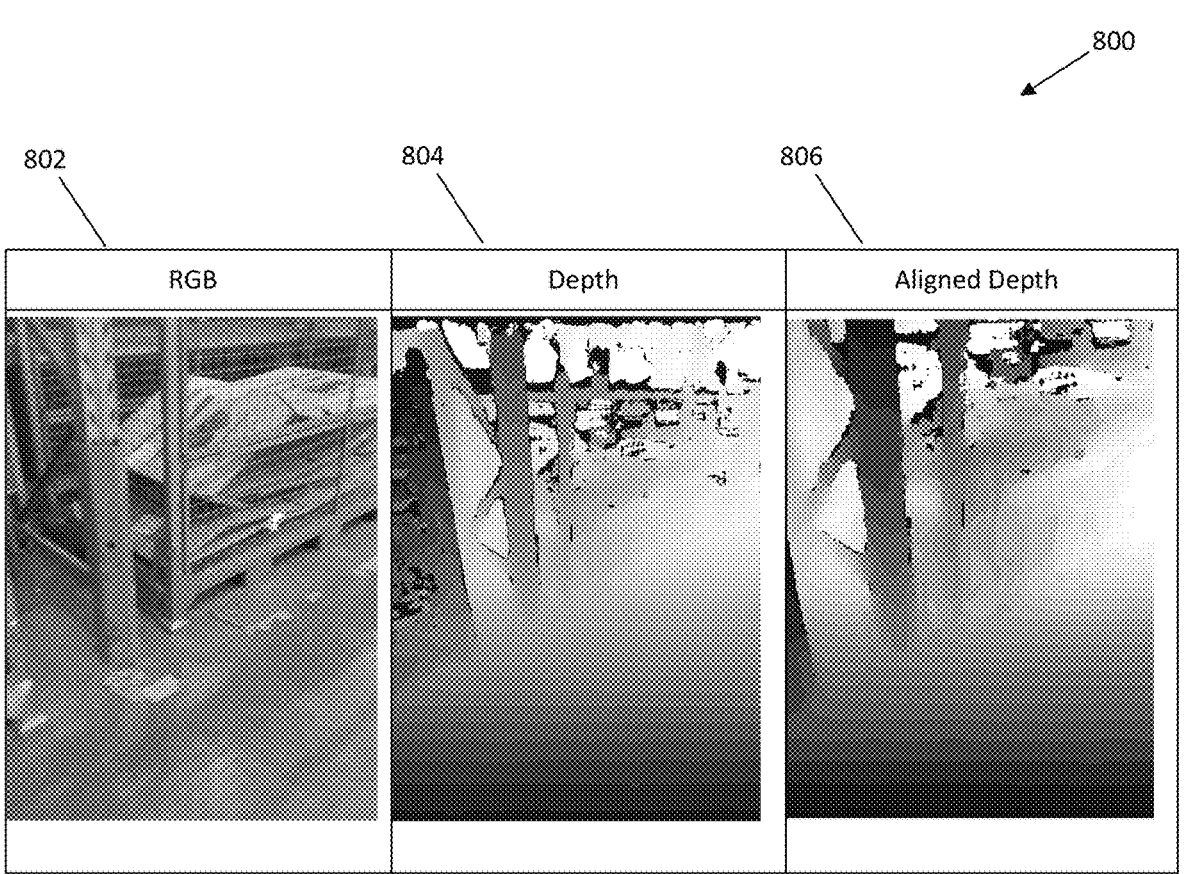
FIG. 8 is a diagram illustrating an exemplary output from a Depth Camera Node camera driver.

RGBDCameraNode (Camera Driver):

FIG. 8 is a diagram illustrating an exemplary output from an RGBD Camera Node camera driver. According to FIG. 8, exemplary output 800 consists of an RGB image 802, a depth image 804 and an aligned depth image 806. The SEMSEG neural network requires both RGB image 802 and depth image 804 as input and outputs binary classification images (0 is floor and 255 is non-floor). The RGB image 802 and depth image 804 need to be aligned and synchronized. Alignment means that every depth pixel corresponds to an RGB pixel.

Synchronization means that the corresponding depth image and RGB image are taken at the same time. A depth camera has 2 separate sensors for RGB and depth, so they are neither aligned nor synchronized by default. Aligned depth may be enabled in the driver by setting an align the depth parameter to true. Synchronization may be enabled by default when alignment is. One may notice that, in this embodiment, RGB/Aligned depth FOV is smaller than Depth FOV. Consequently, the FOV of SEMSEG obstacle detection in this embodiment is smaller than the FOV of the main obstacle detection.

DepthToPixelHeight

This nodelet converts aligned depth to pixel height image. The value of each pixel of a height image shows how far this pixel is from the floor. This embodiment's height image has pixel values in the range [0, 255] and represents heights in range [−0.5 m, 2.0 m]. For example, if a pixel has a value of 50 it means it is on the floor; if a pixel has a value of 75, it means it's 25 cm above the floor, and so on. A height image along with RGB image is used as an input for the neural network.

Height image is calculated by generating a point cloud from an aligned depth image and extracting height from that. Both static and dynamic calibration transforms could be used when calculating height (use_dynamic_calibration parameter).

Inference Manager

Figure 9:
FIG. 9 is a diagram illustrating output of an inference manager.

FIG. 9 is a diagram illustrating the output of an inference manager. According to FIG. 9, output diagram 900 is shown. This nodelet subscribes to synchronized RGB image and height image, resizes them to smaller resolutions, runs inference on them on the ML computation device (via service call which does the actual interaction with the device), thresholds the result to get binary classification, resizes back to 640×480, and publishes the resulting binary classification image. In another embodiment, the image resizing steps may not be required.

Free Space Image to PC

This nodelet converts binary classification images to obstacle point clouds. It creates the point cloud based on non-floor pixels in the binary classification image and checks if a pixel is not occluded by depth camera occlusion mask. In the current embodiment, the occlusion mask check is needed so that the SEMSEG pipeline will not detect the robot itself as an obstacle. In another embodiment, the sensors' fields of view may omit the robot, and thereby not require the occlusion mask check.

Point Cloud to Laser Scan

This nodelet converts SEMSEG obstacle point cloud to laserscan. SEMSEG pipeline does not use any filtering for the obstacle point cloud, so the point cloud is dense. A standard PointCloudToLaserScan algorithm may be used. In one embodiment, a cheaper way of getting $2d$ laserscan from a point cloud utility library may be:

1. Project all point cloud points onto occupancy grid
2. Raycast from camera on the grid to get ranges Changing grid resolution allows to balance between performance and accuracy.

Semseg Health Monitor

Figure 10:
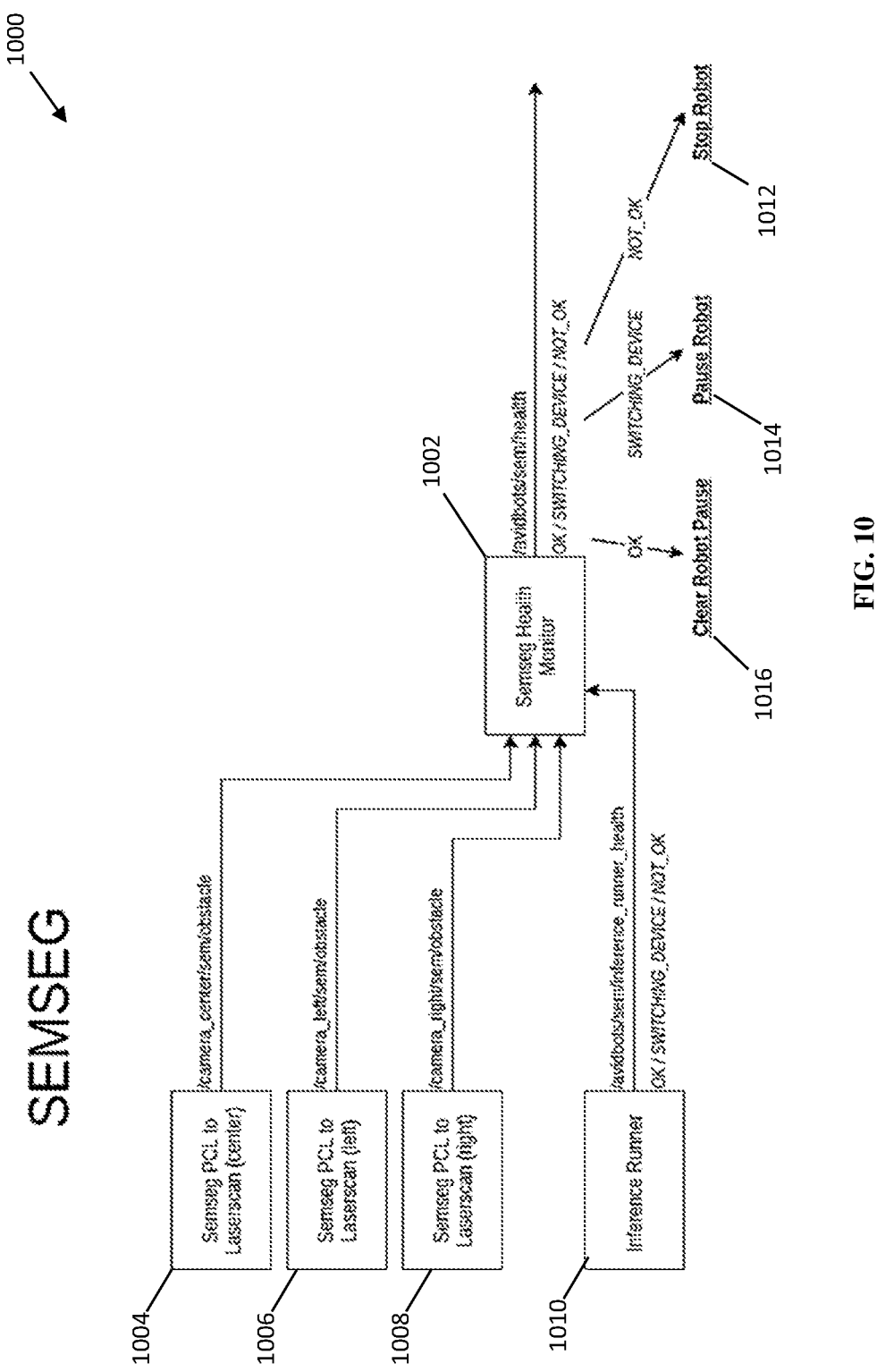
FIG. 10 is a diagram illustrating an exemplary workflow of the semantic segmentation module.

FIG. 10 is a diagram illustrating an exemplary workflow of the Semseg monitor module. According to FIG. 10, the workflow 1000 comprises a Semseg health monitor module 1002 for monitoring the status of semseg which includes inputs from multiple semseg PCL (Point Cloud Library) to laserscan modules 1004, 1006 and 1008 and an inference runner module 1010. The inference runner module 1010 is a service that executes the machine learning inference tasks on the machine learning (ML) computation device.

When the semantic segmentation obstacle detection layer fails to output, the robot is paused at 1014 and/or stopped at 1012. The human in the loop is notified, and a proper message to GUI is shown. Furthermore, if things are OK, the Semseg health monitor will clear the robot pause state at 1016. As a failsafe mode, in this embodiment, when the ML computation device dies or disconnects, the model is executed on CPU with a cost of slightly higher CPU usage (~4%).

According to the disclosure, PCL is an open-source software library of algorithms for processing point clouds. A point cloud is a set of (x, y, z) points in 3-D space representing the positions of obstructions in the environment and is estimated by the semantic segmentation algorithm for each RGBD camera.

According to FIG. 10, the pipeline is shown as performing a ray casting operation (i.e., geometric projection) of each 3-D point cloud into a set of 2-D points (x, y, 0 effectively, i.e. coordinates of the ground xy plane on which the cleaning device travels), and then converts this 2-D set of points into a polar coordinate (theta, r; or bearing, range) representation, as required by the (ROS) laser scan data format (ordered list of range pairs at a given angular min/max and spacing in the camera's down-projected coordinate frame). Since there are 3 cameras (left, center, right) there are 3-point clouds and 3 resulting laser scans. The ray casting operation is done to reduce the computational load of the next algorithm, which is the cost map in the obstacle detection algorithm, because 2-D operations are less computationally intensive than 3-D operations. In another embodiment, a different coordinate basis may be used.

In the case of these outputs going to the health monitor, monitoring of the rate/entries of these topics are disclosed to ensure none are missed or corrupted, as that the workflow has failed to properly convert the RGBD scene into a representation that can be used for obstacle detection and hence safety, with the available actions to pause, stop, or clear fault.

Semseg Health Monitor Behaviour

There are 2 situations of semseg failures including

Failing to run inference on ML computation device

Failing to run inference on both ML computation device and CPU or a crash happened Failing to Run Inference on ML Computation Device:

When the machine learning computation device loses connection because of vibrations/some other issues, the inference steps on the ML device will fail. When it switches from the device to CPU there's a ~20 sec period when there's no semseg output. For that period, in an embodiment, one would pause the robot and then resume after it has switched to CPU. There may not be any remote interventions or GUI messages. There may be a remote message notification on the teleoperation console informing about switching to the CPU device. This will cause ~4% more CPU usage. This is a situation in which the teleoperator may create service tickets for technicians to fix the connection issue. The analysis team may periodically monitor these events based on data similar to bad calibration and may create service tickets to fix it.

Failing to Run Inference on Both ML Device and CPU or a Crash Happened:

The robot should be stopped in this case. The stop is a normal stop and should not be estopped (emergency stopped). Customers may still be able to drive the robot manually. A safety monitor failure may be triggered, and a proper message shown to the operator. The status of the robot may become a red color. The teleoperator may be prevented from clearing the failure unless the error goes away. The teleoperator may create service tickets/bug tickets for technicians/developers.

Semseg Status

According to the disclosure, the Semseg module also provides for the following status info:

1. INITIALIZING: Initial Semseg initialization right after the robot starts up
2. OK: Semseg is running healthy
3. SWITCHING_DEVICE: happens during switching from ML device to CPU. The robot is paused during this time.
4. NOT_OK: both CPU and ML device fail. The robot is stopped for this state.

According to disclosure, a computer-implemented method for using semantic segmentation for identifying low height obstacle avoidance of a semi-autonomous cleaning apparatus is disclosed. The method comprising the steps of receiving visual data from the cleaning apparatus, training the visual data using machine learning algorithms to identify and detect low height obstacles and distinguish between ground and non-ground spaces of the obstacle, passing non-ground spaces to the cleaning apparatus path planning algorithm to avoid these areas, and executing the cleaning apparatus path plan at the cleaning apparatus.

According to disclosure, the step of receiving visual data of the method further comprises receiving visual data from a camera, an RGB camera or one or more sensors. The machine learning algorithms of the method include a deep neural network. The low height obstacle of the method is selected from a list consisting of pallets, cardboard boxes and forklift tines.

According to the disclosure, a computer-implemented method for data collection and training for semantic segmentation for identifying low height obstacle avoidance of a semi-autonomous cleaning apparatus is also disclosed. The method comprising the steps of receiving data from the cleaning apparatus, storing the data in a data store or unlabeled dataset database, creating pseudo labels by running a large capacity teacher model, sending the data to pretrain student model, selecting the best unlabeled dataset and pseudo labels, annotating the unlabeled dataset and pseudo labels; and fine tuning and registering the student model.

According to the disclosure, the method further comprises the step of using annotated and converted into a labeled dataset where the data is used to train a large capacity teacher model. The step of receiving visual data of the method further comprises receiving visual data from a camera, an RGB camera or one or more sensors.

According to the disclosure, the low height obstacle of the method is selected from a list consisting of pallets, cardboard boxes and forklift tines. The step of selecting the unlabeled dataset and pseudo labels of the method further comprises selecting the best or most optimized unlabeled dataset or pseudo labels.

According to the disclosure, a system for using semantic segmentation for identifying low height obstacle avoidance of a semi-autonomous cleaning apparatus is disclosed. The system comprises a plurality of semseg point cloud library (PCL) to laserscan modules, an inference runner module, and a Semseg health monitor module. The Semseg health monitor compiles all data and is configured to provide an output state wherein if the output state is OK, clear cleaning apparatus pause, if output state is switching device, pause cleaning apparatus, and if the output state is not OK, stop cleaning apparatus.

According to the disclosure, the plurality of Semseg point cloud library (PCL) to laserscan modules include a left, right and center module. The compiled data at the Semseg health monitor further comprises visual data received from a camera, an RGB camera or one or more sensors.

According to the disclosure, a computer-implemented method for implementing an inference pipeline to be used for semantic segmentation for identifying low height obstacle avoidance of a semi-autonomous cleaning apparatus is disclosed. The method comprising the steps of receiving an RGB image and a depth image from a driver of the cleaning apparatus, generating a height image from the depth image, sending the RGB image and depth image to an inference manager to get a binary classification image, creating an obstacle point cloud from the binary classification image, converting point cloud to laserscan and sending the laserscan to the cost map module. The binary classification image is configured to identify floor and non-floor objects in the image.

According to the disclosure, the inference manager further comprises the step of running an inference on a machine learning (ML) computation device using neural network. The cost map is used in the planning to generate a path to avoid obstacles There have been numerous deep learning-based solutions for free space detection algorithms. Most of which use only RGB data to detect the free space. However, there is no pipeline of data annotation and data collection for these problems.

Most of the deep learning-based solutions for free space detection algorithms use RGB data. According to the disclosure, the robot operates in the dark therefore the algorithm uses RGB and depth (or height image) to detect the free spaces. This provides the advantage that the algorithm is generalized to a very dark environment. The unique data collection and annotation pipeline also makes it easier to re-train the neural network with new or different obstacle types.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A computer-implemented method for using semantic segmentation for identifying low-height obstacle avoidance of a semi-autonomous cleaning apparatus, the method comprising the steps of:

receiving an RGB image and a depth image from the cleaning apparatus and aligning and synchronizing the RGB image and the depth image;

generating a height image from the aligned depth image, each pixel of the height image indicating height relative to the floor;

running a trained neural network inference using at least the height image and the RGB image to obtain a binary classification image distinguishing floor from non-floor;

creating an obstacle point cloud from non-floor pixels in the binary classification image while excluding pixels occluded by a depth camera occlusion mask;

converting the obstacle point cloud to a laserscan and sending the laserscan to a cost map used by a planner to generate a path that avoids the obstacles; and passing the planned path to the cleaning apparatus and executing the path to avoid the obstacles.

2. The method of claim 1 wherein the step of receiving visual data further comprises receiving visual data from a camera or one or more sensors.

3. The method of claim 1 wherein low-height obstacle comprise at least one of pallets, cardboard boxes and forklift tines.

4. The method of claim 1 wherein the binary classification image identifies floor as a first class and non-floor as a second class.

5. The method of claim 1 wherein generating the height image comprises producing pixel values mapped to heights in the range of approximately −0.5 m to 2.0 m relative to the floor.

6. The method of claim 1 further comprising monitoring the semantic-segmentation pipeline and, when inference is unavailable on a machine-learning accelerator, pausing the cleaning apparatus while switching to CPU inference and resuming when healthy, and stopping the cleaning apparatus if both accelerator and CPU inference are unavailable.

* * * * *